United States Patent [19]

Dicke et al.

[11] Patent Number: 4,603,190

[45] Date of Patent: * Jul. 29, 1986

[54] THERMOTROPIC AROMATIC POLYESTERS HAVING HIGH RIGIDITY AND TOUGHNESS, PROCESS FOR THE PRODUCTION THEREOF AND THE USE THEREOF FOR THE PRODUCTION OF MOULDED ARTICLES, FILAMENTS, FIBRES AND FILMS

[75] Inventors: Hans-Rudolf Dicke; Manfred Schmidt; Dieter Freitag, all of Krefeld; Aziz El-Sayed, Leverkusen, all of Fed. Rep. of Germany

[73] Assignee: Bayer Aktiengesellschaft, Leverkusen, Fed. Rep. of Germany

[ * ] Notice: The portion of the term of this patent subsequent to Aug. 20, 2002 has been disclaimed.

[21] Appl. No.: 627,965

[22] Filed: Jul. 3, 1984

[30] Foreign Application Priority Data

Jul. 16, 1983 [DE] Fed. Rep. of Germany ....... 3325703
May 26, 1984 [DE] Fed. Rep. of Germany ....... 3419749

[51] Int. Cl.$^4$ .............................................. C08G 63/60

[52] U.S. Cl. .................................... 528/193; 528/190; 528/191; 528/194

[58] Field of Search ................. 528/190, 191, 193, 194

[56] References Cited

U.S. PATENT DOCUMENTS

| | | | |
|---|---|---|---|
| 3,637,595 | 1/1972 | Cottis et al. | 528/193 |
| 4,066,620 | 1/1978 | Kleinschuster et al. | 528/191 |
| 4,146,702 | 3/1979 | Morris et al. | 528/191 |
| 4,269,965 | 5/1981 | Irwin | 528/191 |
| 4,374,228 | 2/1983 | Langley | 528/191 |
| 4,412,058 | 10/1983 | Siemionko | 528/191 |
| 4,447,593 | 5/1984 | Funakoshi et al. | 528/191 |
| 4,536,561 | 8/1985 | Schmidt et al. | 528/193 |

*Primary Examiner*—Lester L. Lee
*Attorney, Agent, or Firm*—Connolly and Hutz

[57] ABSTRACT

Thermotropic wholly aromatic polyesters containing condensed residues of p-hydroxybenzoic acid, isophthalic and optionally terephthalic acid, hydroquinone and 3.4'- and/or 4.4'-dihydroxy diphenyl, -diphenyl ether and/or -diphenyl sulphide, have excellent mechanical properties and are nevertheless not difficult to process.

6 Claims, No Drawings

THERMOTROPIC AROMATIC POLYESTERS HAVING HIGH RIGIDITY AND TOUGHNESS, PROCESS FOR THE PRODUCTION THEREOF AND THE USE THEREOF FOR THE PRODUCTION OF MOULDED ARTICLES, FILAMENTS, FIBRES AND FILMS

This invention relates to high molecular weight, thermotropic, fully aromatic polyesters having high rigidity and impact strength and advantageous melt viscosities, a process for the production thereof and the use thereof for the production of mouled articles, filaments, fibres and films.

The term "thermotropic" is applied to those substances which form liquid-crystalline melts. Thermotropic polycondensates are well known; see, for example:

F. E. McFarlane et al., Liquid Crystal Polymers II, Contemporary Topics in Polymer Science, Vol. 2, Plenum Publishing Corporation, 1977;

W. J. Jackson and H. F. Kuhfuss, J.Polymer Science, Polymer Chem. Ed. 14, 2042 (1976);

W. C. Wooten et al. in A. Ciferri "Ultra-high Modulus Polymers", Applied Science Publ., London 1979, p. 362 et seq;

A. Blumstein et al., "Liquid Crystalline Order in Polymers", Academic Press 1978;

J. Preston, Angew. Makromol. Chem. 109/110, S. 1–19 (1982);

A. Ciferri, W. R. Krigbaum, R. B. Meyer "Polymer Liquid Crystals", Academic Press, New York, 1982;

EP-A 1185, 1340, 8855, 11 640, 15 856, 17 310, 18 145, 18 709, 22 344, 44 205, 49 615;

U.S. Pat. Nos. 3,991,013, 3,991,014, 4,066,620, 4,067,852, 4,083,829, 4,107,143;

WO 79/797, 79/1034, 79/1040, and

German Offenlegungsschrift No. 27 51 653.

The liquid-crystalline state of polymer melts may be examined by means of a polarisation microscope. For these investigations, the eyepiece was equipped with an attachment containing a photoelectric diode at the focus of the ocular lens. Using a measurement amplifier connected in series and equipped with a control device, the measured value obtained when the microscope was switched on in the absence of a sample of material and with the nicol prisms arranged in parallel, was adjusted to 100 divisions on the scale. The value obtained with crossed nicol prisms was then 0.01 of a scale division.

The layer thickness of the polycondensate melts examined was 100 μm.

Examination of the liquid-crystalline melts was carried out after the samples had been melted at temperatures of from 280° to 400° C. If a liquid-crystalline melt was observed within either the whole or a part of this temperature range, the polycondensate was classified as thermotropic.

With this equipment, values of above 1, in most cases of from 3 to 90, were obtained for the liquid-crystalline polycondensates. For amorphous melts such as, for instance, aromatic polycarbonates, values of less than 0.1 were obtained.

The method described above is particularly suitable for a rapid laboratory determination and provides unequivocal results in almost all cases. In cases of doubt, however, it may be advisable to confirm the presence of liquid-crystalline components by wide angle X-ray scattering in the melt, as described, for example, in "Plastic Crystals, Physico-Chemical Properties and Methods of Investigation", by G. W. Gray and P. A. Windsor, in particular Chapter 3, John Wiley and Sons, New York, Sydney, Toronto 1974.

German Offenlegungsschrift No. 2,025,971 relates to high molecular weight, fully aromatic polyesters based on p-hydroxybenzoic acid, aromatic dicarboxylic acids (such as terephthalic or isophthalic acids) and diphenols (such as hydroquinone or 4,4'-dihydroxy-biphenyl). These polyesters are thermotropic due to the components used. They may, for example, be processed into fibres. Of the 13 polyesters given in the Examples, only one melts below 300° C.; in other words, these polyesters are not easily processable.

Moulded articles produced from liquid-crystalline melts have mechanical strengths of a quality not normally found in unreinforced polycondensates produced from isotropic melts. The toughness of such moulded products, however, is not entirely satisfactory (see U.S. Pat. No. 4,242,496, EP-A 44 175, W. J. Jackson jr., Brit. Polym. J. 12, 154 (1980)). Our own investigations have confirmed that high strength thermotropic polyesters generally have little toughness, while thermotropic polyesters which are very tough generally have less strength.

It was therefore an object of the present invention to provide thermotropic, fully aromatic polyesters which would be more easily processable than the polyesters according to DE-OS No. 2,025,971 and yet have excellent mechanical properties.

It was a further object of the present invention to provide thermotropic, fully aromatic polyesters which would be able to be processed by thermoplastic shaping into moulded articles which would have both high mechanical strength and great toughness.

Preferred, novel thermotropic fully aromatic polyesters should be thermoplastically processable at temperatures of below 370° C., preferably below 350° C., and more preferably below 330° C.

Preferred, novel thermotropic fully aromatic polyesters should have an impact strength of at least 20 kJ/m$^2$, preferably at least 30 kJ/m$^2$, in particular at least 40 kJ/m$^2$, and they should also have a notched impact strength of at least 10 kJ/m$^2$, preferably at least 20 kJ/m$^2$, in particular at least 25 kJ/m$^2$. In addition, these preferred polyesters should have an E-modulus under bending of at least 4500, preferably at least 6000, more preferably at least 8500 and in particular at least 10000 MPa.

It was surprisingly found that fully aromatic polyesters containing condensed residues of p-hydroxybenzoic acid, isophthalic and optionally terephthalic acid, hydroquinone and 3,4'- and/or 4,4'-dihydroxy-diphenyl, -diphenyl ether and/or -diphenyl sulphide have the desired combination of advantageous properties.

The present invention relates to thermotropic, fully aromatic polyesters based on:

(a) (optionally substituted) p-hydroxybenzoic acid,
(b) isophthalic and optionally terephthalic acid,
(c) hydroquinone and
(d) 3,4'- and/or 4,4'-dihydroxy-diphenyl,
   3,4'- and/or 4,4'-dihydroxy diphenyl ether and/or
   3,4'- and/or 4,4'-dihydroxy diphenyl sulphide, in which the molar ratio of the condensed residues a/b is from 80:20 to 50:50, preferably from
70:30 to 55:45, in particular from
65:35 to 60:40, the molar ratio of the condensed residues b/c/d is from 20:10:10 to 50:48:2, preferably from 30:22:8 to 45:41:4, in particular from 35:29:6 to 40:35:5, and the molar ratio of the condensed residues b/(c+d) is from 0.95:1 to 1.05:1, and up to 50 mol-%, preferably 1 to 40 mol-%, and, more preferably, 10 to 30 mol-% of component (b) can consist of terephthalic acid.

Preferred p-hydroxybenzoic acids (a) are p-hydroxybenzoic acids substituted in the nucleus by $C_1$–$C_4$ alkyl, $C_1$–$C_4$ alkoxy, $C_6$–$C_{10}$ aryl or $C_7$–$C_{12}$ alkaryl groups (such as phenyl, tolyl or naphthyl), or halogen (preferably chlorine), e.g. 4-hydroxy-2-methyl-benzoic acid, 4-hydroxy-3-methyl-benzoic acid, 2-ethyl-4-hydroxy-benzoic acid, 3-ethyl-4-hydroxy-benzoic acid, 4-hydroxy-2-phenyl-benzoic acid or 4-hydroxy-3-phenyl-benzoic acid, but unsubstituted p-hydroxybenzoic acid is particularly preferred.

The residues of compounds (a) to (d) may be contained in the polyesters according to the present invention in random distribution, in segments or in blocks. Concerning component (a), it should be remembered that long or relatively long blocks may greatly increase the melting point and the melt viscosity.

The polyesters according to the present invention may contain, as end groups, COOH, —H, —OH, —$OC_6H_5$, acyloxy or groups derived from chain-terminating agents. Preferred chain-terminators include monofunctional, aromatic hydroxyl compounds, such as 4-hydroxy-diphenyl, p-nonyl-phenol, 4-(1,1,3,3-tetramethyl-butyl)-phenol or β-naphthol, and aromatic monocarboxylic acids, such as diphenyl carboxylic acids and naphthalene carboxylic acids. Chain-terminating agents may be used in quantities of from 0.5 to 5 mol-%, based on the sum of components (a) and (b).

Branching compounds in the form of trifunctional or higher functional, preferably aromatic, monomers, such as phloroglucinol, 1,3,5-benzene-tricarboxylic acid, and 3,5-dihydroxybenzoic acid, may also be used in quantities of from 0.1 to 1 mol-%, based on the sum of components (a) and (b).

The polyesters according to the present invention generally have an inherent viscosity of at least 0.5 dl/g, preferably at least 1.0 dl/g, (determined using a solution of 5 mg of the polyester per ml of p-chlorophenol at 45° C.).

If the polyesters are found to be insoluble in p-chlorophenol, it is assumed that they have the minimum viscosity indicated above. They thus correspond to the present invention, provided they satisfy the parameters of claim 1.

The polyesters according to the present invention preferably have a melt viscosity below 1000 Pa.s, determined at a shearing velocity of $10^3 sec^{-1}$, using a nozzle having a length/diameter ratio of 20:1 at a temperature below 370° C., preferably below 330° C.

The polyesters according to the present invention may be prepared by various methods, e.g. by the condensation or transesterification of reactive derivatives of compounds (a) to (d), e.g. of the esters or acid chlorides thereof, followed by polycondensation.

Examples of preferred starting compounds therefore include the aryl esters, acyl esters and acid chlorides of the said compounds.

According to a preferred method of synthesis, the lower acyl esters, preferably the acetates, of compounds (a), (c) and (d) are reacted with isophthalic and optionally terephthalic acid (b), the acyl esters optionally being prepared in situ.

These reactions can be carried out in the melt; it is, however, also possible to carry out the reaction in the presence of a liquid heat-conducting agent having a high boiling point.

The residues of compounds (a) to (d) are incorporated in the polyesters in the proportions in which the starting components are used.

The polyesters according to the present invention are preferably free from carbonate groups.

Both the condensation or trans-esterification reactions and the polycondensation reactions can be accelerated by means of catalysts. Suitable catalysts for this purpose are well known, e.g. Lewis acids and hydrohalic acids; oxides, hydrides, hydroxides, halides, alcoholates, phenolates, salts of inorganic or organic acids (preferably carboxylic acids), complex salts or mixed salts of alkaline earth metals, such as magnesium or calcium; of transition metals, such as vanadium, titanium, manganese, cobalt, nickel, zinc, lanthanum, cerium or zirconium or of elements from other Groups of the Periodic Table, such as germanium, tin, lead or antimony; or also the alkali metals or alkaline earth metals themselves, in particular sodium; also, sodium hydroxide, lithium acetate, sodium acetate, potassium acetate, calcium acetate, magnesium acetate, cobalt acetate, zinc acetate, calcium benzoate, magnesium acetylacetonate, zinc acetylacetonate, vanadyl $C_1$–$C_8$ alkoxides, titanium alkoxides, such as titanium tetrabutylate or titanium tetrapropylate, alkoxy titanium silicates, zirconium butylate, zirconium propylate, titanium tetraphenolate, sodium phenolate, germanium dioxide, antimony trioxide, dialkyl and diaryl tin oxides, dibutyl tin diacetate and dibutyl dimethoxy tin. Particularly preferred are the acetates of magnesium, manganese, sodium, potassium and zinc.

The quantities of catalyst used are preferably from 0.001 to 1%, by weight, in particular from 0.01 to 0.2%, by weight, based on the total weight of monomers put into the process.

The polyesters according to the present invention may be produced at temperatures of from 160° to 370° C., the reaction being generally started at a low temperature and the temperature then being raised as the reaction progresses. A vacuum may be applied when the reaction slows down, the pressure being preferably lowered from normal pressure to about 0.1 mbar.

The product obtained may be subjected to a solid phase post-condensation under reduced pressure at temperatures of from 200° to 300° C., preferably in the form of a granulate. After from 5 to 25 hours, the molecular weight has increased and the properties of the polyester have, as a result, undergone a marked improvement.

The present invention further relates to a process for the production of the new polyesters by the reaction of components (a) to (d) or of reactive derivatives thereof, which may also be prepared in situ, optionally in the presence of chain-terminators, branching agents and catalysts, at temperatures of from 160° to 370° C., optionally under reduced pressure.

The thermotropic polyesters according to the present invention may, by virtue of the relatively low melt viscosity thereof, advantageously be processed from the molten state to produce injection moulded articles, filaments, fibres, bands and films, the shearing forces occurring in the process giving rise to a molecular orientation which is influenced to a large extent by the magnitude of the shearing forces. The thermotropic polyesters also have a marked structural viscosity, which means that the melt viscosity drops sharply when the shearing forces increase. Suitable methods of processing include injection moulding, extrusion, pressing and melt spinning.

The polyesters according to the present invention may be used to produce moulded articles having high tensile strength, exceptional toughness and great dimensional stability. Since these polyesters have exceptional chemical resistance, as well as being flame-resistant, they are particularly suitable for the production of electrotechnical articles, such as insulators, printed circuits, plugs and parts of instrument panels; parts of industrial chemical apparatus, such as pipes, container linings, rotors, anti-friction bearings, and seals; parts for the internal equipment of aircraft; and parts of technical apparatus used for medical purposes, e.g. parts of air conditioning plants and valves.

The polyesters according to the present invention may also be used as covering and coating materials (in the form of powders or dispersions). They are also eminently suitable for the production of reinforced or filled moulding compounds containing from 5 to 65%, by weight, of reinforcing agent or filler, based on the total weight of reinforced or filled moulding compounds.

The present invention thus also relates to the use of the new polyesters for the production of moulded articles, filaments, fibres and films.

EXAMPLES

The impact strength $a_n$ and notched impact strength $a_k$ were tested on small standard test bars according to DIN 53 453 (ISO/R 179) at 23° C., using 10 test samples for each test. The flexural strength was determined on standard test bars according to DIN 53 452 (ISO/R 178). The flexural E modulus was determined according to DIN 53 457. The dimensional stability under heat was determined by carrying out measurements of the Vicat-B softening temperature according to DIN 53 460 (ISO 306).

Comparison 1

The following substances were weighed into a 1 liter, ground glass vessel equipped with a ground glass lid, a stirrer, a nitrogen inlet tube and a distillation attachment connected to a condenser;
- 2.4 mol=331.49 g of p-hydroxybenzoic acid,
- 1.44 mol=239.23 g of isophthalic acid,
- 1.44 mol=158.56 g of hydroquinone,
- 6.33 mol=646.23 g of acetic anhydride,
- 0.1 g of magnesium acetate and
- 0.15 g of antimony trioxide.

The reaction mixture was heated to 170° C. on a salt bath under a nitrogen atmosphere. As soon as the distillation of acetic acid slowed down (after about 45 minutes), the temperature in the reaction vessel was raised to 250° C. in the course of 1 hour and then to 330° C. in the course of a further hour. After distillation had been completed, the pressure was lowered to about 1 mbar in the course of 30 minutes.

The viscosity of the resulting polymer melt rose sharply during this vacuum phase. The melt was therefore stirred more slowly.

At the end of this phase, a total quantity of 709 g of acetic acid (containing residues of acetic anhydride) had been collected.

The light brown polyester obtained was ground and then subjected to a solid phase post-condensation at 250° C. (under a vacuum of about 1 mbar for 24 hours). The inherent viscosity of the polyester obtained was 1.2 dl/g. In the temperature range of from 300° to 400° C., an optically anisotropic melt phase could be observed.

Comparison 2

The following substances were introduced into the reaction vessel described in Comparison 1:
- 2.4 mol=331.49 g of p-hydroxybenzoic acid
- 1.44 mol=239.23 g of terephthalic acid,
- 1.2 mol=132.13 g of hydroquinone,
- 0.24 mol=48.48 g of 4,4'-dihydroxy-diphenyl ether,
- 6.33 mol=646.23 g of acetic anhydride,
- 0.1 g of magnesium acetate and
- 0.15 g of antimony trioxide.

The temperature-time programme described in Comparison 1 was observed. The contents of the reaction vessel became solid before the final vacuum had been reached (salt bath temperature 350° C.). The product could only be isolated by breaking the glass vessel. The product was insoluble in conventional organic solvents. No anisotropic melt phase was observed.

EXAMPLE 1

The following substances were introduced into the reaction apparatus described in Comparison 1:
- 2.4 mol=331.49 g of p-hydroxybenzoic acid,
- 1.44 mol=239.23 g of isophthalic acid,
- 1.2 mol=132.13 g of hydroquinone,
- 0.24 mol=48.48 g of 4,4'-dihydroxy-diphenyl ether,
- 6.33 mol=646.23 g of acetic anhydride,
- 0.1 g of magnesium acetate and
- 0.1 g of antimony trioxide.

A light beige polyester was obtained according to the temperature-time programme indicated in Comparison 1. This polyester was ground and then condensed in the solid phase at 250° C. (24 hours under a vacuum of about 1 mbar).

The inherent viscosity of the resulting polyester was 1.43 dl/g. An optically anisotropic melt phase was observed within the range of from 300° to 400° C.

EXAMPLE 2

The following substances were introduced into the reaction apparatus described in Comparison 1:
- 2.4 mol=331.49 g of p-hydroxybenzoic acid,
- 1.44 mol=239.23 g of isophthalic acid,
- 1 mol=110.11 g of hydroquinone,
- 0.44 mol=81.84 g of 4,4'-dihydroxy-diphenyl,
- 6.33 mol=646.23 g of acetic anhydride,
- 0.15 g of zinc acetate and
- 0.2 g of germanium oxide.

The temperature-time programme described in Comparison 1 was observed. A light beige polyester which was highly fluid in the molten state at 300° C. was obtained. The product was ground and post-condensed in the solid phase (for 30 hours) at 240° C. under a vacuum (about 1 mbar).

The inherent viscosity of the polyester was 2.31 dl/g. When examined under a polarisation microscope an optically anisotropic melt phase was observed in the range of from 300° to 400° C.

EXAMPLES 3 TO 8

Further polyesters were prepared in the reaction apparatus described in Comparison 1, using the process described there. The nature and quantity of the starting products are listed in Table 1.

TABLE 1

| Example | PHB (mol) | b (mol) | c (mol) | d (mol) | Component d | Inherent Viscosity (dl/g) |
|---|---|---|---|---|---|---|
| 3 | 2.4 | 1.44 | 1.2 | 0.24 | 4,4'—DOD | 2.09 |
| 4 | 2.4 | 1.44 | 1.2 | 0.24 | 4,4'—DODS | 1.45 |
| 5 | 2.1 | 1.5 | 1.4 | 0.1 | 4,4'—DODE | 1.29 |
| 6 | 2.8 | 1.2 | 0.9 | 0.3 | 4,4'—DODE | 1.53 |
| 7 | 2.0 | 1.8 | 1.4 | 0.4 | 3,4'—DODE | 1.08 |
| 8 | 2.4 | 1.2 | 1.0 | 0.2 | 3,4'—DODE | 1.42 |

PHB = p-hydroxybenzoic acid
DODE = dihydroxy-diphenyl ether
DOD = dihydroxy-diphenyl
DODS = dihydroxy-diphenyl sulphide To test the mechanical properties, standard small test bars were produced by injection moulding from the polyesters of Comparison 1 and Examples 1 to 8. The polyester from Comparison 2 could not be processed without decomposition.

The polyesters were processed at temperatures of from 300° to 330° C. The values measured are shown in Table 2.

TABLE 2

| Example | Vicat B (°C.) | $a_n/a_k$ (kJ/m$^2$) | Flexural strength (MPa) | Flexural E-modulus (MPa) | Viscosity (Pa · s)+ |
|---|---|---|---|---|---|
| Comparison 1 | 140 | 8/6 | 150 | 6500 | 800/300° C. |
| Ex. 1 | 130 | 42$^x$/27$^x$ | 160 | 6100 | 460/280° C. |
| 2 | 142 | 51$^x$/39$^x$ | 174 | 7200 | 600/280° C. |
| 3 | 141 | 49$^x$/37$^x$ | 150 | 6950 | 270/300° C. |
| 4 | 148 | 45$^x$/29$^x$ | 154 | 7300 | 150/310° C. |
| 5 | 134 | 43$^x$/29$^x$ | 162 | 6400 | 250/300° C. |
| 6 | 130 | 72$^x$/62$^x$ | 155 | 6150 | 200/320° C. |
| 7 | 128 | 84$^x$/64$^x$ | 160 | 6300 | 160/300° C. |
| 8 | 134 | 48$^x$/41$^x$ | 140 | 7150 | 490/300° C. |

$^x$ = partly broken
+ = melt viscosity at a shearing velocity of 10$^3$ sec$^{-1}$ at the given temperature

EXAMPLE 9

The following substances were introduced into the reaction apparatus described in Comparison 1:

2.4 mol = 331.49 g of p-hydroxybenzoic acid,
1.2 mol = 199.36 g of isophthalic acid,
0.24 mol = 33.87 g of terephthalic acid,
1.2 mol = 132.13 g of hydroquinone,
0.24 mol = 44.64 g of 4.4'-dihydroxy-diphenyl,
6.33 mol = 646.23 g of acetic anhydride,
0.2 g of magnesium acetate and
0.2 g of germanium dioxide.

A light beige product being highly fluid in the molten state was obtained according to the time-temperature programme of Comparison 1. The product was ground and subjected to a solid-phase post-condensation (24 hours under a vacuum of about 1 mbar).

The polyester had an inherent viscosity of 2.8 dl/g. An optically anisotropic melt phase could be observed in the range of from 290° C. to 400° C.

EXAMPLES 10–16

The polyesters listed in Table 3 were prepared in the reaction apparatus according to the process, both described in Comparison 1.

TABLE 3

| Examples | PHB (Mol) | (b) (Mol) | (c) (Mol) | (d) (Mol) | component d | inherent viscosity [dl/g] | anisotropic phase |
|---|---|---|---|---|---|---|---|
| 10 | 2,6 | 1,2 IS 0,2 TS | 1,2 | 0,2 | 4,4'-DOD | 2,82 | 270°–400° C. |
| 11 | 2,8 | 1,1 IS 0,2 TS | 1,1 | 0,2 | 4,4'-DOD | 2,54 | 300°–400° C. |
| 12 | 2,94 | 1,06 IS 0,2 TS | 1,05 | 0,21 | 4,4'-DOD | 2,3 | 290°–400° C. |
| 13 | 2,94 | 0,96 IS 0,3 TS | 1,05 | 0,21 | 4,4'-DOD | 3,14 | 300°–400° C. |
| 14 | 2,8 | 1,0 IS 0,3 TS | 1,1 | 0,2 | 4,4'-DOD | 1,9 | 280°–400° C. |
| 15 | 2,6 | 1,2 IS 0,2 TS | 1,2 | 0,2 | 4,4'-DODE | 1,98 | 260°–400° C. |
| 16 | 2,6 | 1,2 IS 0,2 TS | 1,2 | 0,2 | 4,4'-DODS | 2,94 | 310°–400° C. |

PBH = p-hydroxybenzoic acid
DOD = dihydroxy-diphenyl
IS = isophthalic acid
TS = terephthalic acid
DODE = dihydroxy-diphenyl ether
DODS = dihydroxy-diphenyl sulphide To test the mechanical properties, standard small test bars were produced by injection moulding from the polyester of Comparison 1 and Examples 9 to 16. The polyesters were processed by temperatures between 290° and 330° C. The results are listed in Table 4.

TABLE 4

| Examples | Vicat B (°C.) | $a_n/a_k$ (kJ/m$^2$) | Flexural strength (MPa) | Flexural E-modulus (MPa) | Viscosity (Pa · s)$^{xx}$ |
|---|---|---|---|---|---|
| Comparison 1 | 140 | 8/6 | 150 | 6.500 | 800/300° C. |
| Ex. 9 | 143 | 48$^x$/42$^x$ | 194 | 10.300 | 700/290° C. |
| 10 | 133 | 43$^x$/30$^x$ | 179 | 8.900 | 500/280° C. |
| 11 | 135 | 58$^x$/37$^x$ | 188 | 10.100 | 200/320° C. |
| 12 | 138 | 46$^x$/42$^x$ | 195 | 10.600 | 250/320° C. |
| 13 | 144 | 32$^x$/42$^x$ | 197 | 12.300 | 190/320° C. |
| 14 | 141 | 55$^x$/44$^x$ | 192 | 10.900 | 280/320° C. |
| 15 | 128 | 65$^x$/38$^x$ | 195 | 10.300 | 300/300° C. |
| 16 | 147 | 35$^x$/26$^x$ | 188 | 11.200 | 290/320° C. |

$^x$ = partly broken
$^{xx}$ = melt viscosity at a shearing velocity of 10$^3$ sec$^{-1}$ at the given temperature

EXAMPLE 17

The following substances were introduced into a heatable 25 l-vessel from V4A-steel equipped with a stirrer, a nitrogen inlet tube and a distillation attachment connected to a condenser:

31.2 mol = 4309 g of p-hydroxybenzoic acid,
14.4 mol = 2392 g of isophthalic acid,
2.4 mol = 399 g of terephthalic acid,
14.4 mol = 1586 g of hydroquinone,
2.4 mol = 447 g of 4,4'-dihydroxy-diphenyl,
76.8 mol = 7841 g of acetic anhydride, 5 g of magnesium acetate and
2 g of germanium dioxide.

After applying a vacuum and subsequently filling the vessel with nitrogen three times, the vessel was heated to 170° C. During this step, nitrogen was passed over at a flow rate of 20 l/h. After 2.5 hours at 170° C., the temperature was increased, over a period of 30 minutes to 200° C., then over a period of 1.5 hours to 250° C. and then over a period of 1.5 hours up to 300° C. At 300° C., normal pressure was initially maintained for 1 hour, and then the pressure was lowered to 20 mbar in the course of 1.5 hours. The vessel was filled with nitrogen, and the product was discharged under pressure through a valve in the base and granulated.

The resulting light beige product was post-condensed in the solid state at 240° C. (in vacuo of about 1 mbar for 24 hours).

The polyester had an inherent viscosity of 1.4 dl/g. In the range of 310° C. to 400° C., the product formed an optically anisotropic melt phase.

For the testing of the mechanical properties, bars for flexural and tensile strength tests were produced from the polyester by injection-moulding. The following values were measured:

| | |
|---|---|
| $a_n$: | 76 [kJ/m$^2$] (partly broken) |
| $a_k$: | 48 [kJ/m$^2$] (partly broken) |
| Flexural strength: | 222 MPa |
| Flexural E-modulus: | 11 100 MPa |
| Tensile strength: | 188 MPa |
| Tensile E-modulus: | 23 800 MPa |
| Vicat-B temperature: | 140° C. |

We claim:

1. Thermotropic, fully aromatic polyesters based on
   (a) p-hydroxybenzoic acid or substituted p-hydroxybenzoic acid substituted by $C_1$–$C_4$ alkyl, $C_1$–$C_4$ alkoxy, $C_6$–$C_{10}$ aryl or $C_7$–$C_{12}$ alkaryl or halogen;
   (b) isophthalic acid or a mixture of isophthalic acid with at most 50% terephthalic acid;
   (c) hydroquinone; and
   (d) 3,4'-dihydroxy-diphenyl, 4,4'-dihydroxy-diphenyl, 3,4'-dihydroxy-diphenyl ether, 4,4'-dihydroxy-diphenyl ether, 3,4'-dihyroxy-diphenyl sulphide, 4,4'-dihydroxy-diphenyl sulphide, or mixtures thereof;

in which the molar ratio of the condensed residues a/b is from 80:20 to 50:50,
   the molar ratio of the condensed residues b/c/d is from 20:10:10 to 50:48:2
   and the molar ratio of the condensed residues b/(c+d) is from 0.95 to 1.05, and up to 50 mol-% of component (b) is terephthalic acid.

2. Polyesters according to claim 1, characterised in that the molar ratio of the condensed residues a/b is from 70:30 to 55:45 and the molar ratio of the condensed residues b/c/d is from 30:33:8 to 45:41:4.

3. Polyesters according to claim 1, characterised in that the molar ratio of the condensed residues a/b is from 65:35 to 60:40 and the molar ratio of the condensed residues b/c/d is from 35:29:6 to 40:35:5.

4. Polyesters according to claim 1, characterised in that component (b) contains terephthalic acid in an amount of from 1 to 40 mol-%, based on (b).

5. Polyesters according to claim 1, characterised in that component (b) contains terephthalic acid in an amount of from 10 to 30 mol-%, based on (b).

6. Polyester articles in the form of moulded articles, filaments, fibers and films fabricated from the polyester according to claim 1.

* * * * *